United States Patent
Agnihotri et al.

(10) Patent No.: US 6,311,321 B1
(45) Date of Patent: Oct. 30, 2001

(54) IN-CONTEXT LAUNCH WRAPPER (ICLW) MODULE AND METHOD OF AUTOMATING INTEGRATION OF DEVICE MANAGEMENT APPLICATIONS INTO EXISTING ENTERPRISE MANAGEMENT CONSOLES

(75) Inventors: Manoj B. Agnihotri, Lake Oswego; Chiaohuey (Peter) Tung, Portland, both of OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/253,534

(22) Filed: Feb. 22, 1999

(51) Int. Cl.[7] .................................................. G06F 9/45
(52) U.S. Cl. .......................... 717/1; 717/11; 710/103; 709/220
(58) Field of Search .................. 717/1, 11; 710/72, 710/8, 103; 709/220, 221, 222, 223, 224, 225

(56) References Cited

U.S. PATENT DOCUMENTS

| | | | |
|---|---|---|---|
| 5,388,211 | * | 2/1995 | Hornbuckle ................................ 80/4 |
| 6,032,202 | * | 2/2000 | Lea et al. ................................. 710/8 |
| 6,052,750 | * | 4/2000 | Lea ........................................ 710/72 |
| 6,167,403 | * | 12/2000 | Whitmire et al. ...................... 707/10 |
| 6,212,585 | * | 4/2001 | Chrabaszcz .......................... 710/103 |
| 6,226,788 | * | 5/2001 | Schoening et al. ...................... 717/6 |

OTHER PUBLICATIONS

Title: U–Net: a user–level network interface for parallel and distributed computing (includes URL), Eicken et al, 1995, ACM.*

Title: Remote–Access Technologies: Distant Harvest Depends on Tools for : Remote sites, source: Communications Week, (Oct. 12, 1992).*

Title: Network Management: Will NT Balance the Load? Bruce et al, 1997, Network computing.*

* cited by examiner

Primary Examiner—Kakali Chaki
Assistant Examiner—Chameli C. Das
(74) Attorney, Agent, or Firm—Antonelli, Terry, Stout & Kraus, LLP

(57) ABSTRACT

Embodiments of the present invention are directed to an In-Context Launch Wrapper (ICLW) module which provides a comprehensive generic interface for automating integration of device management applications (applets) into existing Enterprise management console(s) installed at a host system of a network for centralized remote device management of remote network devices on a network. The ICLW module comprises a set of extensible software components, including: an Install component which provides a file based interface to device management applications for installation specific to the existing enterprise management consoles; a MConsole Interface component which provides a comprehensive generic interface to existing enterprise management consoles for enabling integration of device management applications into the existing enterprise management consoles; a Discovery component which provides a discovery interface to the existing enterprise management consoles for identifying remote network devices on a network; and a Trap Extension component which provides an extension interface to the existing enterprise management consoles for handling Simple Network Management Protocol (SNMP) traps on a network.

23 Claims, 4 Drawing Sheets

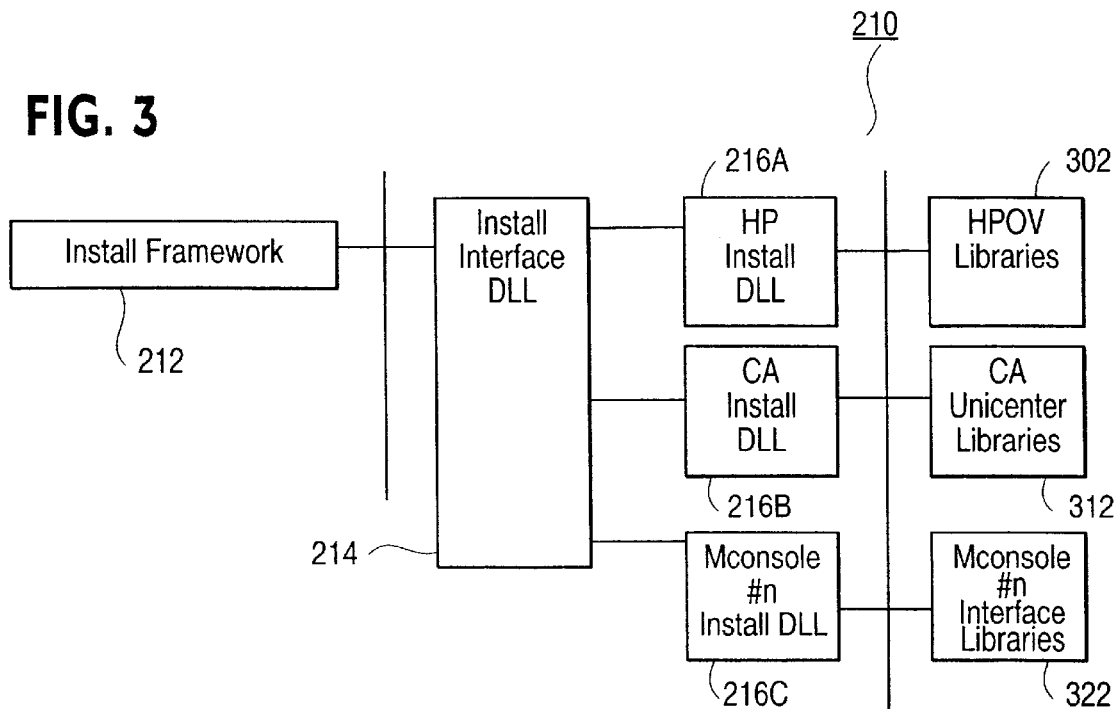
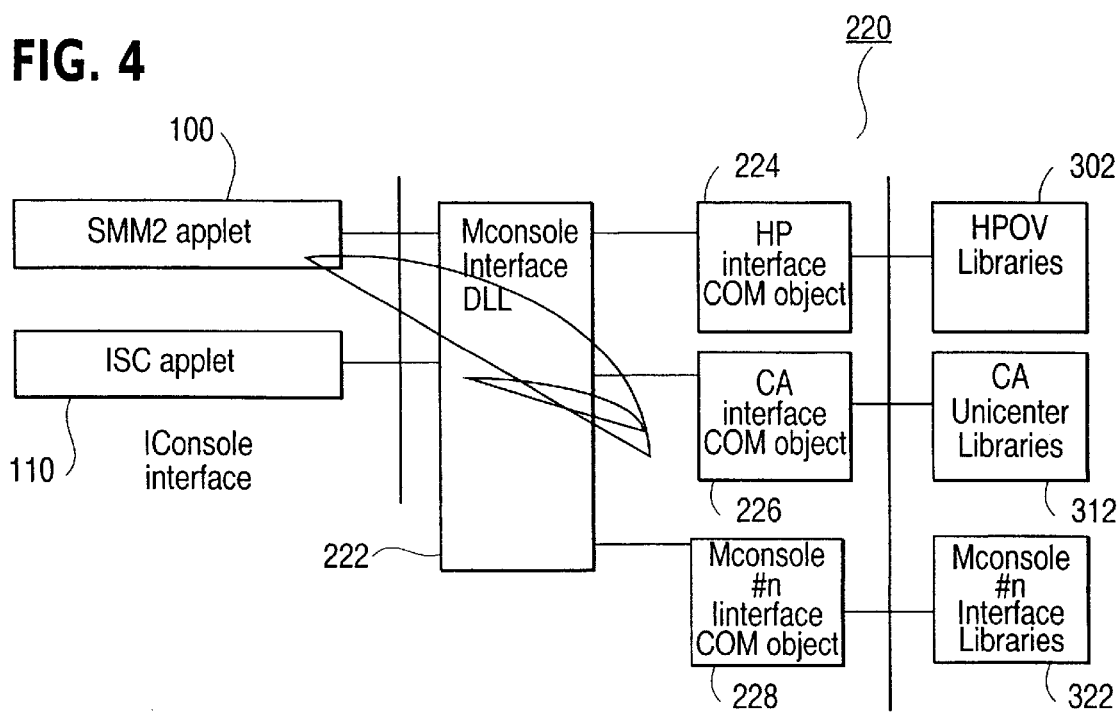

IN-CONTEXT LAUNCH WRAPPER (ICLW) MODULE AND METHOD OF AUTOMATING INTEGRATION OF DEVICE MANAGEMENT APPLICATIONS INTO EXISTING ENTERPRISE MANAGEMENT CONSOLES

TECHNICAL FIELD

The present invention relates to Enterprise management applications, and more particularly to an In-Context Launch Wrapper (ICLW) module which provides a comprehensive generic interface for automating integration of device management applications into existing multiple Enterprise management consoles without software customization for centralized, remote device management operations on a network.

BACKGROUND

A typical network for corporate computing environments may be one or more local area networks (LANs). One example of a network may be illustrated in FIG. 1 as comprising a host system 12 which contains at least one processor and a plurality of network devices 16, 18, 20. The host system 12 and the network devices 16, 18, 20 may be servers, workstations, desktops and mobile personal computers (PCs) or other types of communication devices connected on the network 10. The host system 12 may contain one or more console control programs such as the popular Enterprise management console software 14, and may serve as an Enterprise management console for providing centralized enterprise management solutions. The Enterprise management console software 14 may be provided by different vendors, such as, for example, Hewlett Packard (HP) OpenView Network Node Manager (NNM)®, Computer Associates (CA) Unicenter TNG Framework®, Intel LANDesk Server Manager® (LDSM), Intel LANDesk Client Manager® (LDCM), and IBM Tivoli Netview®.

Each Enterprise management console software 14 may be used to allow the network administrator at the host system 12 to centralize operations of the various network devices 16, 18, 20 on the network 10, such as to discover and map all network devices 16, 18, 20 on the network 10 and display the correct device icons (graphical representations) in the network map for remote management of network devices 16, 18, 20 on the network 10. Device (or LAN) management applications (or applets) may be installed at the host system 12 for allowing the network administrator to actually manage operations of the various network devices 16, 18, 20 on the network 10, such as to remote control, reset and restoration, and to perform diagnostics, inventory, monitoring and emergency-management recovery. Examples of such device management applications (applets) include System Management Module (SMM) applets, Intel Server Control (ISC) applets, Remote Diagnostics applets, and Cluster applets, known as "Concord." Many device management applications for PCs and servers may also be provided by Intel LANDesk Server Manager® (LDSM), Intel LANDesk Client Manager® (LDCM) and related Intel LANDesk family of products which may be available to the network administrator to monitor PC health such as conditions of any disk drive, memory, fan, temperature, voltage, chassis, boot process, to review system inventory, to power on, off and reboot remote PCs on the network, and to monitor server functions over the network. However, these device management applications must be plugged-in and arduously integrated into the popular Enterprise management console software 14 using one of HP OpenView, CA Unicenter, Intel LDSM/LDCM, and IBM Tivoli before launching for remote management operations on the network 10.

One common solution to application integration may be to write new console integration code for every application-console pair existed on the network. This may be necessary because the device management applications and the Enterprise management console software may be manufactured by different commercial vendors such as HP, CA, Intel, and IBM with different, and often times not compatible software architecture and/or language. For example, if the network contains an Enterprise management console using a HP OpenView, and a device management application such as a SMM Applet needs to be integrated for remote management operations, a new console integration code must be written in accordance with HP OpenView specification in order to integrate such a SMM Applet into the HP OpenView console. Subsequently, if another Enterprise management console using a different enterprise management application such as CA Unicenter is available on the network, then another console integration code must be written in accordance with CA Unicenter specification in order to integrate the same SMM Applet into the CA Unicenter console. Consequently, new console integration code must be written to integrate a specific device management application for each of different Enterprise management console software on the network. These requirements and the time and expenditure of software engineering required to customize individual device management applications to operate in conjunction with diverse Enterprise management consoles on the network can be substantial both in cost and labor. Especially considering the fact that there can be hundreds or even thousands of different possible configurations.

Therefore, there is an urgent need for comprehensive generic and extensible interface solutions for automating integration of device management applications (applets) into existing multiple Enterprise management console software installed at a host system for centralized remote device management operations over a network.

SUMMARY

Accordingly, various embodiments of the present invention are directed to an In-Context Launch Wrapper (ICLW) module which provides a comprehensive generic interface for automating integration of different device management applications (applets) into different Enterprise management console(s) installed at a host system of a network for centralized remote device management of remote network devices on a network.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein:

FIG. 3 illustrates a functional diagram of an example Install module 210 of the In-Context Launch Wrapper (ICLW) application 200 according to the principles of the present invention.

FIG. 4 illustrates a functional diagram of an example MConsole Interface module 220 of the In-Context Launch Wrapper (ICLW) application 200 according to the principles of the present invention;

DETAILED DESCRIPTION

While the following detailed description focuses on an example In-Context Launch Wrapper (ICLW) embodiments which provides a comprehensive generic interface for automating integration of several example device management applications (applets), such as SMM Applet, ISC Applet, Remote Diagnostics Applet, and Concord, into the popular example Enterprise management consoles such as HP OpenView, CA Unicenter, Intel LDSM and/or LDCM, and IBM Tivoli, for centralized remote device management on a network according to the principles of the present invention, the present invention is not limited thereto. More particularly, the present invention may be equally applicable for automating integration of other types of device management applications (applets) and/or Enterprise management applications as well as other types of networks and/or network devices.

Figure 1:
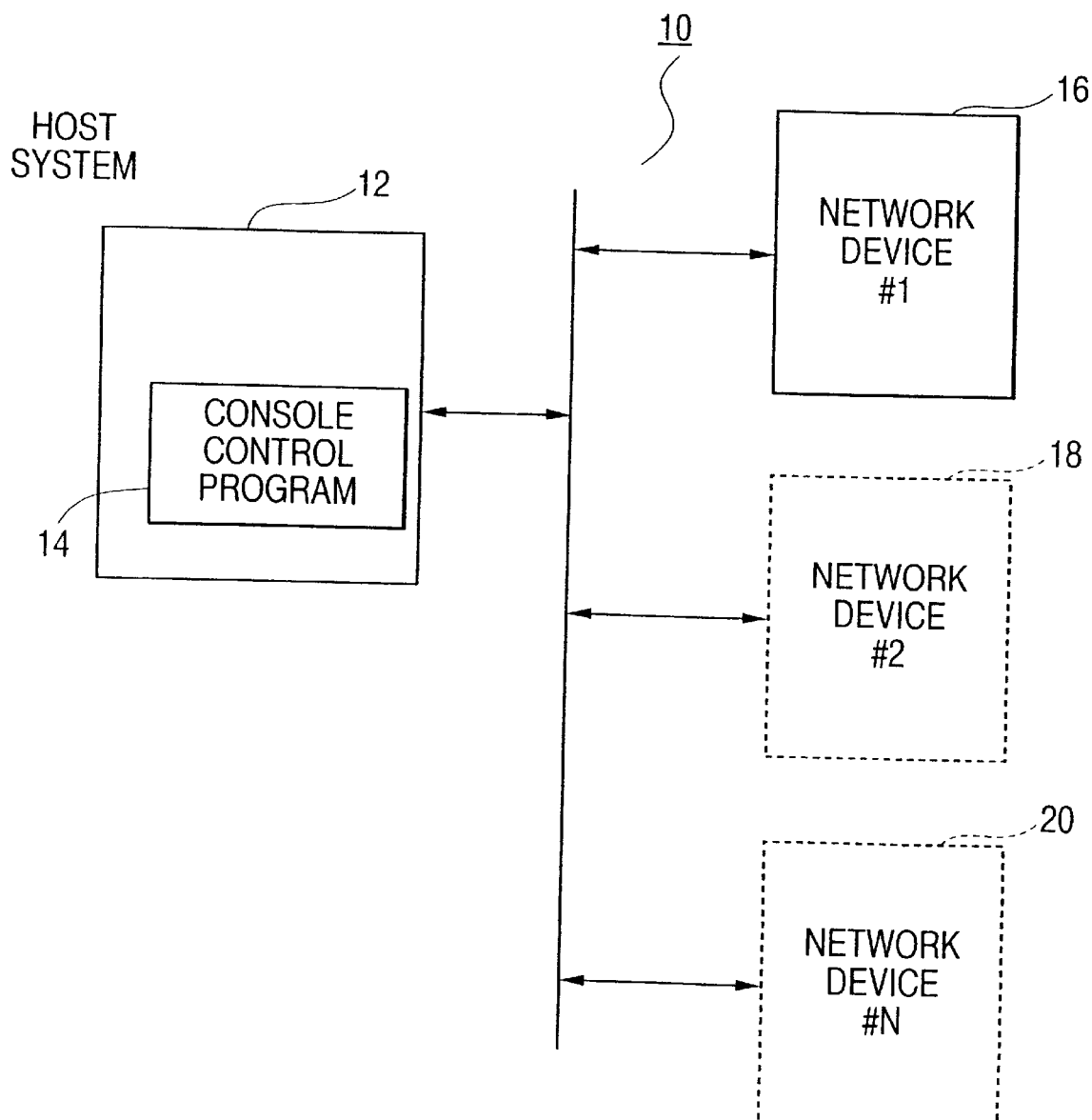
FIG. 1 illustrates an example background network including an Enterprise management console and a plurality of network devices.
Figure 2:
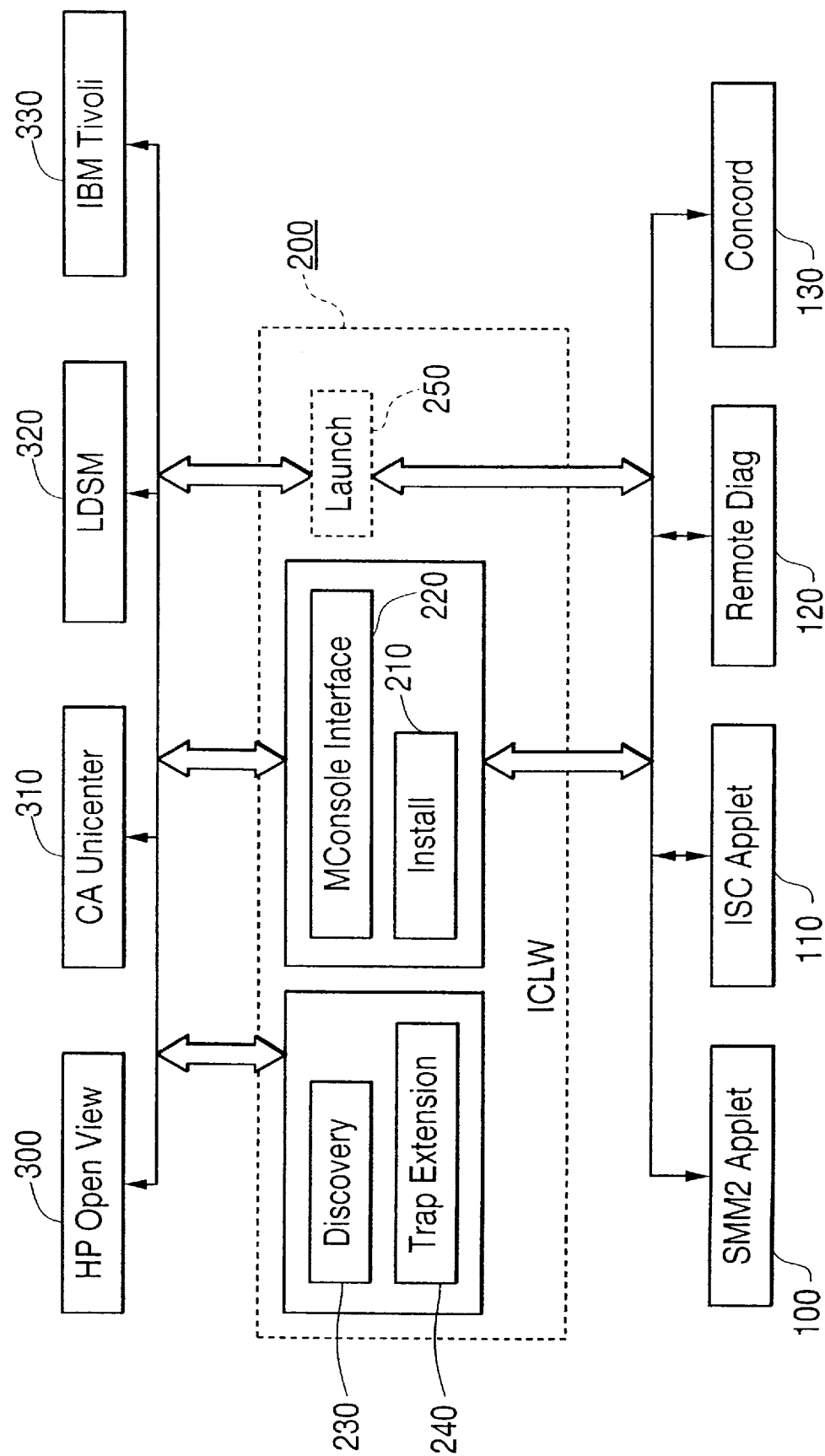
FIG. 2 illustrates a block diagram of an example In-Context Launch Wrapper (ICLW) application 200 which provides a comprehensive generic interface for automating integration of several device management applications (applets) into multiple Enterprise management consoles for centralized remote device management on a network according to the principles of the present invention.

Reference is now made to implementation arrangements and particularly to FIG. 2 which illustrates an example embodiment of an In-Context Launch Wrapper (ICLW) application for providing a comprehensive generic interface to automate integration of device management applications (applets) into the popular Enterprise management consoles installed at a host system 12 for centralized remote device management on a network 10 according to the principles of the present invention. As shown in FIG. 2, the In-Context Launch Wrapper (ICLW) application 200 contains a set of extensible software components, including an Install module 210, a MConsole Interface module 220, a Discovery module 230, a Trap Extension module 240, and optionally, a Launch module 250 that may be used to integrate device management applications (applets) 100, 110, 120, 130 into multiple Enterprise management console software 300, 310, 320, 330 which may be installed at a host system 12. These software components may be discrete modules of an overall In-Context Launch Wrapper (ICLW) application 200, and may be used to automate the tasks required by a specific device management application (applet) to integrate into a particular Enterprise management console software installed at a host system 12. Examples of device management applications (applets) may include SMM® Applet 100, ISC® Applet 110, Remote Diagnostics Applet 120, and Concord® 130. Some of the popular Enterprise management console software installed at a host system 12 may include HP OpenView® 300, CA Unicenter® 310, Intel LDSM® 320, and IBM Tivoli® 330.

The software components, such as the Install module 210, the MConsole Interface module 220, the Discovery module 230, and the Trap Extension module 240 may be configured and/or written in accordance with the Multi-Platform Manager (MPM) application programming interface (API) specification (version 1.0) as set forth by Intel and Tivoli in fall 1996 for integration and interoperability between device management applications (applets) and Enterprise management consoles. These software components may be used to automate most of the needed tasks, such as generic trap handling, generic $2^{nd}$ level discovery and generic installation, for a specific device management application (applet) to integrate into a particular Enterprise management console for remote management operations on a network 10. This way the device management applications (applets) may be constructed to be aware of only one console, that is the MConsole interface 220 of the In-Context Launch Wrapper (ICLW) module 200. Consequently, only one set of generic console integration code may be used by the In-Context Launch Wrapper (ICLW) module 200 to automate integration of different device management applications into multiple Enterprise management consoles, such as HP OpenView 300, the CA Unicenter 310, the Intel LDSM 320, and the IBM Tivoli 330 on a network 10. No integration code change may be required for different Enterprise management consoles 300, 310, 320, 330. This may be possible because all console specifics of different Enterprise management consoles may be hidden inside the In-Context Launch Wrapper (ICLW) module 200, and snap-in mechanisms for supporting additional Enterprise management consoles may be file based. The In-Context Launch Wrapper (ICLW) application 200 may be extended to support as many additional Enterprise management consoles as necessary.

The In-Context Launch Wrapper (ICLW) application 200, as shown in FIG. 2, may be a software module provided on a tangible medium, such as a floppy disk or compact disk (CD) ROM, or via Internet downloads, which may be available for a network administrator to conveniently plug-in or download into the existing Enterprise management console. Such software module may also be bundled with the existing Enterprise management console which may be activated by the network administrator for automating integration of device management applications into multiple Enterprise management consoles on a network 10. Alternatively, the In-Context Launch Wrapper (ICLW) application 200 may also be available as a firmware module or a comprehensive hardware/software module which may be built-in the centralized console.

Turning now to FIG. 3, a functional diagram of an example Install module 210 of the In-Context Launch Wrapper (ICLW) application 200 according to the principles of the present invention is illustrated. The Install module 210 may be used to provide a file based interface to applets for installing applet components, such as the applet.exe and dynamics link libraries (DLLs), and components specific to the Enterprise management console such as class object definitions (in case of CA Unicenter console). The Install module 210 may be extended to accommodate installation of new applets and/or new Enterprise management consoles at the host system 12 with additional input files. As shown in FIG. 3, the Install module 210 comprises an Install framework 212, an Install interface DLL 214, and a plurality of console install DLLs 216A, 216B, 216C for providing a comprehensive generic interface for installation of applets into existing Enterprise management consoles such as HP OpenView, CA Unicenter and other MConsoles via corresponding HP OpenView Libraries 302, and CA Unicenter Libraries 312 and other MConsole #N Interface Libraries 322.

The Install framework 212 may support a wizard application that may take the user (network administrator) step-by-step through the installation process. For example, the wizard application may first determine what and how many Enterprise management consoles are installed at a host system 12 and provides the user the option to select one console. Then, the wizard application may provide additional information about the selected console. The wizard application may read an install file for the component (applet) to be installed. The install file may contain a configuration file and an image file for graphical representation on the console. Sample install files may be used to populate the input fields on the screens so that the user may review the inputs and make appropriate change if necessary. After the inputs are confirmed by the user, the wizard application may proceed to install the component (applet) and make appropriate updates to the console to integrate the component (applet).

The console libraries of files such as HP OpenView Libraries 302, CA Unicenter Libraries 304 and other MConsole #N Interface Libraries 322 may be part of the Enterprise management consoles, such as HP OpenView 300, the CA Unicenter 310, the Intel LDSM 320, and the IBM Tivoli 330 installed at a host system 12 as shown in FIG. 2, and may contain console information specific to different Enterprise management consoles. For example, the HP OpenView Libraries 302 may contain information specific to HP OpenView console 300. Similarly, the CA Unicenter Libraries 304 may contain information specific to CA Unicenter console 310. Likewise, the MConsole #N Interface Libraries 322 may contain information specific to that MConsole such as, for example, the Intel LDSM 320 and the IBM Tivoli 330 as shown in FIG. 2. Such console information may include installation directory, language, console version, etc.

The individual console install DLLs such as the HP Install DLL 216A, the CA Install DLL 216B, and MConsole #N Install DLL 216C may act as translators for respective Enterprise management consoles which may translate instructions from the Install Interface DLLs 214 requested by the Install framework 212 into console specific commands for installation.

The Install Interface DLL 214 may store generic instruction sets (i.e., interface programs) for supporting the installation process, including providing console information such as installation directory, language, console version, etc. Individual instruction sets (in bold print) and textual comments may be written in any of the C-family (e.g., C or C++) code language. However, other program languages included in the non-exhaustive list of Basic and Pascal may also be used.

For example, the first instruction set stored in the Install Interface DLL 214 may be used to determine the number of Enterprise management consoles (software applications) installed at a host system 12. The instruction set may be written in C or C++ code language as provided as follows.

HRESULT ICLWGetNumConsolesInstalled (WORD *pwNumConsoles);

| | |
|---|---|
| pwNumConsoles: | Variable to hold number of consoles |
| Return Value: | S_ICLW_OK indicates success |
| | Error codes defined as follows and are used to indicate failure: The error codes are defined in <iclwerr.h>, specific errors and function prototypes are defined in other header files, and are included in a source file |
| Remarks: | Get the number of consoles installed. |

The second instruction set stored in the Install Interface DLL 214 may be used to obtain detailed information of the Enterprise management consoles installed at the host system 12. Similarly, the instruction set may be written in C or C++ code language as provided as follows.

HRESULT ICLWGetConsoleInstallInfo (LPCONSOLEINFO pConsoleInfo, WORD wNumConsoles);

| | |
|---|---|
| pConsoleInfo: | Array of Console information structures |
| wNumConsoles | Number of elements |
| Return Values: | S_ICLW_OK indicates success |
| | Error codes defined as follows and are used to indicate failure: The error codes are defined in <iclwerr.h>, specific errors and function prototypes are defined in other header files, and are included in a source file |
| Remarks: | Get the information of consoles installed on the system. |

The third instruction set stored in the Install Interface DLL 214 may be used to process install file for installation of an applet. Likewise, the instruction set may be written in C or C++ code language as provided as follows.

HRESULT ICLWProcessInstallFile(LPCTSTR IpszFileName);

| | |
|---|---|
| IpszFileName: | Full path to the Install file |
| Return Value: | S_ICLW_OK indicates success |
| | Error codes defined as follows and are used to indicate failure: The error codes are defined in <iclwerr.h>, specific errors and function prototypes are defined in other header files, and are included in a source file |
| Remarks: | Process the install file. |

Again, it should be understood that practice of the present invention is not limited to the above or below discussed example instructions.

FIG. 4 illustrates a functional diagram of an example MConsole Interface (MCI) module 220 of the In-Context Launch Wrapper (ICLW) application 200 according to the principles of the present invention. The MConsole Interface module 220 may be useful in abstracting different Enterprise management consoles from the applet by providing a comprehensive generic interface to existing Enterprise management consoles. As shown in FIG. 3, the MConsole Interface (MCI) 210 may comprise a dynamic link library (DLL) 222 and a plurality of interface COM objects 224, 226, 228 for automating integration of device management applications (applets) such as a SMM applet 100 and an ISC applet 110 into existing Enterprise management consoles such as HP OpenView, CA Unicenter via corresponding HP OpenView Libraries 302, and CA Unicenter Libraries 312 and MConsole Interface Libraries 322.

The console libraries such as HP OpenView Libraries 302, CA Unicenter Libraries 304 and other MConsole #N Interface Libraries 322 may contain console information specific to different Enterprise management consoles, such as HP OpenView 300, the CA Unicenter 310, the Intel LDSM 320, and the IBM Tivoli 330 as shown in FIG. 2.

Such console information may include installation directory, language, console version, etc.

The individual interface COM objects such as the HP Interface COM object 224, the CA Interface COM object 226 and MConsole #N interface COM object 228 may act as translators for respective Enterprise management consoles which may translate instructions from the MConsole Interface DLLs 222 into console specific commands.

The MConsole Interface DLL 222 may store generic instruction sets (i.e., interface programs written typically in C and C++ language, but not limited thereto) for providing a comprehensive generic interface to all applets such as SMM applet 100 and ISC applet 110 and generic mechanisms to obtain generic and instance specific properties from any console, such as to generate events and log message to the console. The properties can be properties of the console such as the language and version being run or device properties such as the card type of a SMM card, the server name, etc. Individual instruction sets (in bold print below) and textual comments may be written in the non-exhaustive list of C or C++ code language.

For example, the first instruction set stored in the MConsole Interface DLL 222 may be initiated by the applet used to determine which Enterprise management console (software application) installed at a host system 12 may be needed for integration. The instruction set may be written in C or C++ code language as provided as follows.

**HRESULT ICLWInitMCI(DWORD dwConsoleID, IUnknown \*\*ppUnk);**

| | |
|---|---|
| dwConsoleID: | The console identifier |
| ppUnk: | Pointer to Iunknown pointer. If the Iunknown pointer is not needed pass NULL |
| Return Value: | S_ICLW_OK indicates success<br>Error codes defined as follows and are used to indicate failure: The error codes are defined in <iclwerr.h>, specific prototypes are defined in other header files and are included in a source file |
| Remarks: | Initialize the Mconsole interface DLL 222 and optionally returns the IUnknown pointer. Release the Iunknown pointer after finished. |

The second instruction set stored in the MConsole Interface DLL 222 may be referred to as a get property procedure and may be used during a 2nd discovery application to get information of a network device, which may be needed for integration. The instruction set may be written in C or C++ code language as provided as follows.

**HRESULT ICLWGetProperty(LPDEVICEIDSTRUCT pDeviceId, LPCTSTR pszPropertyName, WORD \*pwType, void\*\*ppBuff, DWORD \*\*pdwSize);**

| | |
|---|---|
| pDeviceId: | The structure has three fields that are used to identify the device. The fields are: ObjectId (console specific id passed in the command-line), AppletId, and the network address (command-line) |
| pszProperty Name: | The generic name of the property. This name is defined in xxdevprp.ini |
| pwType: | The data type of the property. The types are defined in "Iclwtype.h". If the type passed is incorrect the type will be changed, check the type on return |
| ppBuff: | Pointer to buffer pointer. The buffer will be allocated using the 'ICLWMemAlloc' function. The caller should free the buffer using ICLWMemFree function |
| PdwSize: | Size of the buffer in bytes |
| Return Value: | S_ICLW_OK indicates success<br>Error codes defined as follows and are used to indicate failure: The error codes are defined in <iclwerr.h>, specific prototypes are defined in other header files and are included in a source file |
| Remarks: | Get the property from the object defined in the Mconsole. This function is used by the applet to get properties of the device they are managing. The properties are defined in xxdevprp.ini. They may also need to be defined in the console if they are special properties of the network device. The device extensions can also use this function during the 2$^{nd}$ level of discovery to get properties directly from the console if they are available. Since there is no guarantee that they are available the device extension should have a alternate mechanism to get the properties |
| Sample: | //This function gets the server name(string) and prints it Foo(LPTSTR szObjId, LPTSTR szAppletId, LPTSTR szNetAddress)<br>{<br>void \*pszServerName;<br>DWORD dwcardType;<br>DWORD dwSize;<br>WORD wType = ICLW_STRING;<br>DeviceId DevId;<br>SetUpDeviceId(&DevId,szObjId,szAppletId, szNetAddress)<br>if(S_ICLW_OK==ICLWGetProperty(&DevId, "SERVER_NAME" &wType, &pszServerName, &dwSize)<br>printf("ServerName=%s", (LPTSTR)pszServerName);<br>ICLWMemFree(pszServerName); }<br>The void \*\* is used to oveload the ICLWGetProperty function to support multiple data types. |

The third instruction set stored in the MConsole Interface DLL 222 may be referred to as a set property procedure and may be used to set information of a network device, which may be needed for integration. The instruction set may be written in C or C++ code language as provided as follows.

**HRESULT ICLWSetProperty(LPDEVICEIDSTRUCT pDeviceId, LPCTSTR pszPropertyName, WORD wType, Void\*pBuff, DWORD dwSize);**

| | |
|---|---|
| pDeviceId: | The structure has three fields used to identify the device. The fields are: ObjectId (console specific id passed in the command-line), AppletId, and the network address (obtained from command-line) |
| PszPropertyName: | The generic name of the property. This name is defined in xxdevprp.ini |
| wType: | The data type of the property. The types are defined in "Iclwtype.h" |
| pBuff: | Pointer to buffer. A pointer to appropriate data type should be cast to a void\* and passed |
| dwSize: | Size of the buffer in bytes |
| Return Value: | S_ICLW_OK indicates success<br>Error codes defined as follows and are used to indicate failure: The error codes are defined in <iclwerr.h>, specific prototypes are defined in other header files and are included in a source file |
| Remarks: | Set the property for the object defined in the Mconsole. This function will be typically used by device extension DLLs in the 2nd level discovery. |

The fourth instruction set stored in the MConsole Interface DLL 222 may be initiated by the applet used to get console information of a network device, which may be needed for integration. The instruction set may be written in C or C++ code language as provided as follows.

HRESULT ICLWGetConsoleInfo(LPCONSOLEINFO *pConsoleInfo);

| | |
|---|---|
| pConsoleInfo: | Pointer to the console info structure pointer. The structure will be allocated by ICLW, free the structure after use with ICLWMemFree |
| Return Value: | S_ICLW_OK indicates success Error codes defined as follows and are used to indicate failure: The error codes are defined in <iclwerr.h>, specific prototypes are defined in other header files and are included in a source file |
| Remarks: | Get the console info. |

The fifth instruction set stored in the MConsole Interface DLL 222 may be initiated by the applet used to get console trap information of a network device, which may be needed for integration. The instruction set may be written in C or C++ code language as provided as follows.

HRESULT ICLWGetConsoleTrapInfo(LPTRAPINFO*pTrapInfo);

| | |
|---|---|
| pTrapInfo: | Pointer to the trap info structure pointer. The structure will be allocated by ICLW, free the structure after use with ICLWMemFree |
| Return Value: | S_ICLW_OK indicates success Error codes defined as follows and are used to indicate failure: The error codes are defined in <iclwerr.h>, specific prototypes are defined in other header files and are included in a source |
| Remarks: | Get the IP address of the console and the port its listening for traps. |

The sixth instruction set stored in the MConsole Interface DLL 222 may be initiated by the applet used to generate an event, which may be needed for integration. The instruction set may be written in C or C++ code language as provided as follows.

HRESULT ICLWGenerateEvent(LPEVENTSTRUCT pEvent);

| | |
|---|---|
| pEventInfo: | Pointer to the event structure |
| Return Value: | S_ICLW_OK indicates success Error codes defined as follows and are used to indicate failure: The error codes are defined in <iclwerr.h>, specific prototypes are defined in other header files and are included in a source file |
| Remarks: | Generate an event on the console. |

The seventh instruction set stored in the MConsole Interface DLL 222 may be initiated by the applet to log a message, which may be needed for the Enterprise management console.

The instruction set may be written in C or C++ code language as provided as follows.

HRESULT ICLWLogMessage(LPLOGENTRYSTRUCT pLogEntry);

| | |
|---|---|
| pLogEntry: | Pointer to the log entry structure |
| Return Value: | S_ICLW_OK indicates success Error codes defined as follows and are used to indicate failure: The error codes are defined in <iclwerr.h>, specific prototypes are defined in other header files and are included in a source file |
| Remarks: | Log a message to the console. |

The eighth instruction set stored in the MConsole Interface DLL 222 may be used to exit the In-Context Launch Wrapper (ICLW) message. The instruction set may be written in C or C++ code language as provided as follows.

HRESULT ICLWExitMCIO;

| | |
|---|---|
| Return Value: | S_ICLW_OK indicates success Error codes defined as follows and are used to indicate failure: The error codes are defined in <iclwerr,h>, specific prototypes are defined in other header files and are included in a source file |
| Remarks: | Release the resources of Mconsole Interface DLL. |

The ninth instruction set stored in the MConsole Interface DLL 222 may be used to get a simple network management protocol (SNMP), which may be needed for integration. The instruction set may be written in C or C++ code language as provided as follows.

HRESULT ICLWSNMPGet(LPSNMPGETSTRUCT IpSNMPGet, WORD *pwType, void**ppBuff, DWORD*pdwSize);

| | |
|---|---|
| IpSNMPGet: | Pointer to the SNMP get structure |
| pwType: | The data type of the property. The types are defined in "Iclwtype.h". If the type passed is incorrect the type will be changed, check the type on return |
| ppBuff: | Pointer to buffer pointer. The buffer will be allocated using the 'ICLWMemAlloc' function. The caller should free the buffer using ICLWMemFree function |
| PdwSize: | Size of the buffer in bytes |
| Return Value: | S_ICLW_OK indicates success Error codes defined as follows and are used to indicate failure: The error codes are defined in <iclwerr.h>, specific prototypes are defined in other header files and are included in a source file |
| Remarks: | Use SNMP to do a get on a MIB (Management Information Base). |

The tenth instruction set stored in the MConsole Interface DLL 222 may be used to set a simple network management protocol (SNMP), which may be needed for integration. The instruction set may be written in C or C++ code language as provided as follows.

HRESULT ICLWSNMPSet(LPSNMPSETSTRUCT pSNMPSet, WORD wType, void*pBuff, DWORD dwsize);

| | |
|---|---|
| pSNMPSet: | Pointer to the SNMP set structure |
| wType: | The data type of the property. The types are defined in "Iclwtype.h" |
| pBuff: | Pointer to buffer. A pointer to appropriate data type should be cast to a void * and passed. |
| dwSize: | Size of the buffer in bytes |
| Return Value: | S_ICLW_OK indicates success Error codes defined as follows and are used to |

| | |
|---|---|
| Remarks: | indicate failure: The error codes are defined in <iclwerr.h>, specific prototypes are defined in other header files and are included in a source file Use SNMP to set a value in a MIB (Management Information Base). |

The eleventh instruction set stored in the MConsole Interface DLL 222 may be used to set a symbol status of a network device. The instruction set may be written in C or C++ code language as provided as follows.

HRESULT ICLWSetSymbolState (LPDEVICEIDSTRUCT pDeviceId, DWORD dwState);

| | |
|---|---|
| pDeviceId: | Pointer to the device id structure |
| dwState: | The state can be ICLW_SYMBOL_ALERT, ICLW_SYMBOL_WARNING, or ICLW_SYMBOL_NORMAL |
| Return Value: | S_ICLW_OK indicates success Error codes defined as follows and are used to indicate failure: The error codes are defined in <iclwerr.h>, specific prototypes are defined in other header files and are included in a source file |
| Remarks: | Set the state of the symbol on the console. |

The twelfth instruction set stored in the MConsole Interface DLL 222 may be used to perform memory allocation functions on the Enterprise management console. The instruction set may be written in C or C++ code language as provided as follows.

LPVOID ICLWMemAlloc(DWORD dwsize);

| | |
|---|---|
| dwSize: | Size in bytes. |
| Return Value: | Allocated memory block, Memory block allocated successfully. NULL, insufficient memory available |
| Remarks: | Allocate a block of memory. Use this function to allocate memory for buffers passed to the MCI functions. |

The thirteenth instruction set stored in the MConsole Interface DLL 222 may be used to perform memory reallocation functions on the Enterprise management console. The instruction set may be written in C or C++ code language as provided as follows.

LPVOID ICLWMemReAlloc(LPVOID IpBuff, DWORD dwsize);

| | |
|---|---|
| IpBuff: | Pointer to the buffer to be reallocated |
| dwSize: | Size in bytes |
| Return Value: | Reallocated memory block, Memory block successfully reallocated. NULL, insufficient memory or dwSize is zero |
| Remarks: | Allocate a block of memory. Use this function to allocate memory for buffers passed to the MCI functions. |

The fourteenth instruction set stored in the MConsole Interface DLL 222 may be used to free memory from the Enterprise management console. The instruction set may be written in C or C++ code language as provided as follows.

HRESULT ICLWMemFree(LPVOID IpBuff);

| | |
|---|---|
| IpBuff: | Pointer to the buffer to be freed |
| Return Value: | S_ICLW_OK indicates success Error codes defined as follows and are used to indicate failure: The error codes are defined in <iclwerr.h>, specific prototypes are defined in other header files and are included in a source file |
| Remarks: | Allocate a block of memory. Use this function to allocate memory for buffers passed to the MCI functions. |

The fifteenth and sixteenth instruction sets stored in the MConsole Interface DLL 222 may relate to the use of the COM interface at the console interface COM objects such as HP OpenView interface COM object 224, CA Unicenter interface COM object 226, and MConsole #N interface COM object 228. When the COM interface may be used, the 'ICLWInitMCI' function may be called to get the IUnknown pointer. Query interface for a IConsole pointer may be made by referring to console.h for the interface definition. The Iunknown and the IConsole pointer may be released before calling ICLWExitMCI. The IConsole pointer may provide almost exactly identical functions as the C interface. The only exceptions may be the 'GetProperty' and 'SetProperty' functions. These 'GetProperty' and 'SetProperty' functions may be written in C or C++ code language as provided as follows.

HRESULT ICLWGetProperty(LPDEVICEIDSTRUCT pDeviceId, LPCTSTR pszPropertyName, variant*pvarg);

| | |
|---|---|
| pDeviceId: | The structure has three fields used to identify the device. The fields are: ObjectId (console specific id passed in the command-line), AppletId, and the network address (command-line) |
| pszPropertyName: | The generic name of the property. This name is defined in xxdevprp.ini |
| pvarg: | Pointer to a variant. Check the type on return and use the appropriate union member |
| Return Value: | S_ICLW_OK indicates success Error codes defined as follows and are used to indicate failure: The error codes are defined in <iclwerr.h>, specific prototypes are defined in other header files and are included in a source file |
| Remarks: | Same as for the ICLWGetProperty in the MConsole interface. |

HRESULT ICLWSetProperty(LPDEVICEIDSTRUCT pDeviceId, LPCTSTR pszPropertyName, variant*pvarg);

| | |
|---|---|
| pDeviceId: | The structure has three fields to identify the device. The fields are: ObjectID (console specific id passed in the command-line), AppletId, and the network address (obtained from command-line) |
| PszPropertyName: | The generic name of the property. This name is defined in xxdevprp.ini |
| pvarg: | Pointer to a variant |
| Return Value: | S_ICLW_OK indicates success Error codes defined as follows and are used to indicate failure: The error codes are defined in <iclwerr.h>, specific prototypes are defined in other header files and are included in a source file |
| Remarks: | Same as for the ICLWSetProperty in the MConsole interface. |

Figure 5:
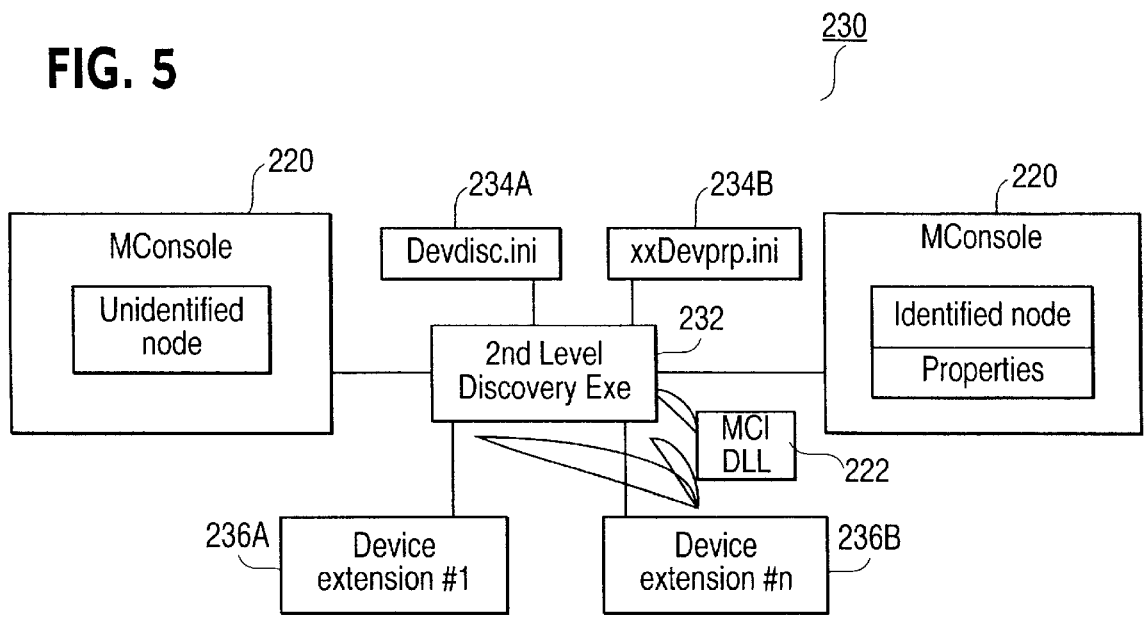
FIG. 5 illustrates a functional diagram of an example $2^{nd}$ level Discovery module 230 of the In-Context Launch Wrapper (ICLW) application 200 according to the principles of the present invention.

FIG. 5 illustrates a functional diagram of an example Discovery module 230 of the In-Context Launch Wrapper (ICLW) application 200 according to the principles of the present invention. The Discovery module 230 may be known as a $2^{nd}$ level Discovery module, and may be provided for each Enterprise management console installed and/or which may potentially be installed at a host system 12 which may call into device specific extensions to do specific device discovery. The $2^{nd}$ level Discovery module 230 may be required to identify the type of a network device, such as ISC server or SMM card, and to also get additional properties of such device. As shown in FIG. 5, the $2^{nd}$ level Discovery module 230 may contain a $2^{nd}$ level discovery.exe block 232, Devdisc.ini files 234A, xxDevprp.ini files 234B, and a plurality of device extensions such as device extension #1 236A and device extension #N 236B. The Devdisc.ini files 234A and the xxDevprp.ini files 234B may be configuration and initialization files. The device extension #1 236A and device extension #N 236B may be software components for representing different network devices 16, 18, 20 on a network 10. It should be understood that FIG. 5 is actually a diagram over time, wherein the left-hand portion of such figure is illustrative of a starting state where the MConsole interface 220 has an unidentified node, a middle portion of such FIGURE illustrates procedures, etc., used to gather additional information, and a right-hand portion is illustrative of an ending state where the MConsole interface 220 now contains an identified node as well as found properties.

More particularly, the $2^{nd}$ level discovery.exe block 232 may interact with MConsole Interface module 220 via MCI DLL 222 to obtain specific information of the network device and related properties. For example, at the end of the $1^{st}$ (initial) level discovery which may be provided by most Enterprise management consoles, the MConsole Interface module 220 may contain unidentified node. The $2^{nd}$ level Discovery module 230 may be initiated by the console in order to obtain an identification of such node of the network device and related properties. The $2^{nd}$ level Discovery module 230 may also be used to gather further detailed information with respect to already known nodes. Device specific extensions such as device extension #1 236A and device extension #N 236B may be called to do specific device discovery. Instruction sets stored in the MConsole Interface DLL 222 may be used export a 'DISC2CheckDeviceIdentity' function (given below) and may implement the 'DISC2GetProperty' function (given below) during the $2^{nd}$ level discovery. The instruction sets imported from MConsole Interface DLL 222 may be written in C or C++ code language as provided as follows.

HRESULT DISC2CheckDeviceIdentity (LPDEVICEIDSTRUCT pDeviceId, BOOL *bNoGets);

| | |
|---|---|
| pDeviceId: | The structure has three fields that are used to identify the device. The fields are: ObjectId (console specific id), AppletId, and the network address (IP/IPX). The ObjectId and the network address Will be set in the structure when it is passed to the function |
| BNoGets: | Set this to 1 if GetProperty calls need not be made. If set to 1, the assumption is that either properties of device are not available or the SetProperty call in the MCI dll is used to set the properties of device |
| Return Value: | S_ICLW_OK indicates that the device at the network address is correct<br>S_ICLW_FALSE indicates that the device is incorrect |
| Remarks: | The $2^{nd}$ level discovery exe will call this function in device extension DLL to check if the device at the given network address has been identified as correct. The network address is passed in the DeviceId structure. Set the AppletId field in the structure before returning from the function. |

HRESULT DISC2GetProperty(LPDEVICEIDSTRUCT pDeviceId, LPCTSTR bpszPropertyName, WORD wType, void **ppBuff, DWORD *pdwSize);

| | |
|---|---|
| pDeviceId: | The structure has three fields that are used to identify the device. The fields are: ObjectId (console specific id), AppletId, and the network address (IP/IPX) |
| pszPropertyName: | The generic name of the property. This name is defined in xxdevprp.ini |
| wType: | The data type of the property. The types are defined in "Iclwtyp.h" |
| ppBuff: | Pointer to buffer pointer. Allocate the buffer using the 'ICLWMemAlloc' function. The caller will free the buffer |
| PdwSize: | Size of the buffer in bytes |
| Return Value: | S_ICLW_OK indicates success<br>Error codes defined as follows and are used to indicate failure: The error codes are defined in <iclwerr.h>, specific prototypes are defined in other header files and are included in a source file |
| Remarks: | The $2^{nd}$ level discovery exe will call this function in device extension DLL to get the properties of the identified device. Depending on the type, a pointer to a DWORD, or a string etc. may be sent. The $2^{nd}$ level discovery exe will use the type information from xxDevprp.ini to cast to the correct type. Set the AppletId field in the Device id structure before returning from the function. |

The Devdisc.ini files 234A of the $2^{nd}$ level Discovery module 230 may list the device extension DLLs that the $2^{nd}$ level Discovery module 230 may call. Every device extension that may need to be called may have an entry in the INI files. The format may be as follows.

[DEVDISC]
NumExtensions=2
DDE—DeviceName#1=ISC
DDE DLLPath#1=%ISC PATH%lscdisc.dll The xxDevprp.ini files 234B of the $2^{nd}$ level Discovery module 230 may list the properties of the device and the corresponding console specific names for the attributes. There may be a single file from the xxDevprp.ini files 234B for each Enterprise management console. The format may be as follows.

[Generic]
NumProperties=2
DP_GenericName#1=ServerName
DP_ConsoleSpecificName#1=CA_SERVER_NAME
DP_Type#1-ICLW_STRING
[SMM]
NumProperties=2
DP_GenericName#1=CardType
DP_ConsoleSpecificName#1=CA_CARD_TYPE
DP_Type#1=ICLW$_{=13}$ STRING For every device extension (DLL) listed in the Devdisc.ini files 234A of the $2^{nd}$ level Discovery module 230, the $2^{nd}$ level discovery.exe block 232 of the $2^{nd}$ level Discovery module 230 may call the Disc2CheckDeviceIdentify function first. If the device may be identified, an appropriate success value may be returned. There may be two ways of giving properties of the identified device to the 2$^{nd}$ level Discovery module 230.

1. The Device extension can use the ICLWSetProperty call provided by the MCI dll to set the properties on the object, while it is in the Disc2CheckDeviceIdentity call. It can assume that the MCI dil is initialized and therefore does not need to call the ICLWInitMCI and the ICLWExitMIC functions. If it uses the ICLWSetProperty function, it should set the bNoGets flag to 1 in the Disc2CheckDeviceIdentity call. If this flag is set, no more calls will be made into the device extension dll. To use the ICLWSetProperty the device extension DLL needs to link with MCI.lib.

2. The other way to return properties is to wait for the GetProperties call. If the device extension choose to wait for the Disc2GetProperty calls, it should set the bNoGets flag to 0. This may require a saving state between functions calls depending on implementation.

Figure 6:
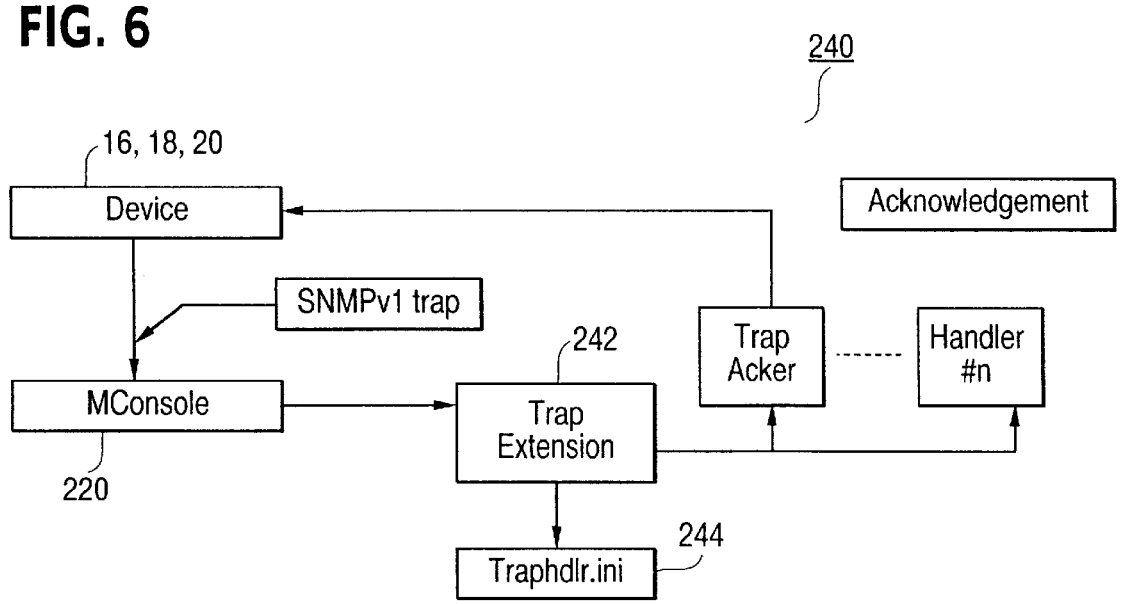
FIG. 6 illustrates a functional diagram of an example Trap Extension module 240 of the In-Context Launch Wrapper (ICLW) application 200 according to the principles of the present invention.

FIG. 6 illustrates a functional diagram of an example Trap extension module 240 of the In-Context Launch Wrapper (ICLW) application 200 according to the principles of the present invention. The Trap extension module 240 may be used to extend the Enterprise management console's trap handling for purposes of automating integration of a specific applet into the existing Enterprise management console. The Trap extension mechanism may be very handy for special trap handling. For example, when a network device under management such as SMM server may send Simple Network Management Protocol (SNMP) traps and those SNMP traps are not acknowledged, the SMM server may not know if the SNMP traps were received. With the Trap extension application 240 in place, when a SNMP trap may be received from SMM server, the Enterprise management console may handle the SNMP trap, and then call the Trap extension which may acknowledge the SNMP trap.

The SNMP Trap extension and acknowledgment may be described in greater detail with reference to FIG. 6. The Trap extension module 240 may contain a Trap extension block 242, and Traphdlr.ini files 244 which may handle trap extension. The Trap extension block 242 may use the SNMP management API with Windows NT, for example, so as not to depend on SNMP support on the Enterprise management console. When a network device 16, 18, or 20 may generate an event (SNMP trap) to the Enterprise management console, the MConsole Interface module 220 of the In-Context Launch Wrapper (ICLW) application 200 may access the Trap extension block 242 using Traphdlr.ini files 244 to handle the SNMP trap and to send a SNMP Trap acknowledgment to such a network device 16, 18, 20 (see FIG. 6 feedback loop) for integration with the Enterprise management console. This may be necessary because the SNMPv1 protocol may not provide a mechanism for acknowledging a SNMP trap. One common solution may be to set a flag in the network device Management Information Base (MIB) files which may be used to define SNMP traps and variables, when the SNMP trap may be sent from the network device 16, 18, 20. The flag may be reset by the receiver of the SNMP trap via SNMPSet function, which may be used to acknowledge SNMP trap receipt. If the flag may not be reset before a time-out, the network device 16, 18, 20 may take certain actions such as trying to send the SNMP trap again or use other alternate mechanisms to acknowledge such a receipt.

Lastly, the FIG. 2 example Launch module 250 of the In-Context Launch Wrapper (ICLW) application 200 may be optional. Most Enterprise management consoles may provide a comprehensive mechanism for launching applications with command-lines. For example, a HP OpenView console may allow the user (network administrator) to launch specific device management application from the Enterprise management console toolbar icon, menu, or submap using a graphic user interface. Consequently, the launch procedure may not be needed unless the Enterprise management consoles may not contain mechanisms for launching operations.

As described from the foregoing, the In-Context Launch Wrapper (ICLW) application according to the present invention has several advantages. First, ICLW application may provide an management solution to integration and interoperability between LAN management applications and Enterprise management applications. Second, the ICLW application may efficiently automate integration of device management software functionality into existing Enterprise management consoles which may allow the network administrator to easily manage all aspects of the enterprise from a single console, desktop and mobile PC systems. Third, the ICLW application may launch any device management software from the Enterprise management console toolbar icon, menu, or submap for viewing and remote management over a network. Fourth, the ICLW application may lower the cost of managing complex corporate computing environments. Lastly, the ICLW application may be extendable to accommodate integration of newly developed Enterprise management console software as well as newly developed device management applications.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, additional device management application programs of different vendors may be provided to allow greater integration with different Enterprise management console framework. A network may include a local area network (LAN), a wide are network (WAN), a campus area network (CAN), a metropolitan area network (MAN), a global area network (GAN), and a system area network (SAN) for linking together computers, servers, workstations, peripherals, storage devices, and other types of communication devices for communications. Many modifications may be made to adapt a particular situation to the teachings of the present invention without departing from the central scope thereof. Therefore, it is intended that the present invention not be limited to the various exemplary embodiments disclosed, but that the present invention includes all embodiments falling within the scope of the appended claims.

What is claimed is:

1. An In-Context Launch Wrapper (ICWL) module residing on a computer readable medium which provides a comprehensive generic interface for automating integration of different device management applications into different enterprise management consoles installed at a host system of a network for centralized remote device management of remote network devices on said network, said In-Context Launch Wrapper (ICWL) comprising:

an Install component which provides a file based interface to said device management applications for installation specific to the existing enterprise management consoles;

a MConsole Interface component which provides said comprehensive generic interface to existing enterprise management consoles for enabling integration of said device management applications into the existing enterprise management consoles;

a Discovery component which provides a discovery interface to the existing enterprise management consoles for identifying remote network devices on said network; and a Trap Extension component which provides an extension interface to the existing enterprise management consoles for handling Simple Network Management Protocol (SNMP) traps on said network.

2. An In-Context Launch Wrapper (ICWL) module as claimed in claim 1, wherein said Install component, said MConsole Interface component, said Discovery component, and said Trap Extension component are extensible software components.

3. An In-Context Launch Wrapper (ICLW) module as claimed in claim 2, wherein aid set of extensible software components, including said Install component, said MConsole Interface component, said Discovery component, and said Trap extension component is embodied in one a software module provided on a tangible medium, a firmware module, and a comprehensive hardware/software module built-in the host system.

4. An In-Context Launch Wrapper (ICLW) module as claimed in claim 2, wherein said Install component comprises:

an Install framework which supports a wizard application for guiding installation of the enterprise management consoles at the host system;

an Install Interface dynamic link library (DLL) which contains generic instruction sets for supporting installation of the enterprise management consoles at the host system and for providing console information including installation directory, language, and console version to the host system; and a plurality of console install libraries of different enterprise management consoles at the host system which serve as translators for respective enterprise management consoles for translating instructions from the Install Interface dynamic link library (DLL) requested from the Install framework into console specific commands for installation.

5. An In-Context Launch Wrapper (ICLW) module as claimed in claim 2, wherein said MConsole Interface component comprises:

a MConsole Interface dynamic link library (DLL) which contains generic instruction sets for providing said comprehensive generic interface to said device management applications, and generic mechanisms to obtain generic and specific properties of the enterprise management consoles; and a plurality of console interface COM objects of different enterprise management consoles at the host system which serve as translators for respective enterprise management consoles for translating instructions from the device management applications into console specific commands for integration.

6. An In-Context Launch Wrapper (ICLW) module as claimed in claim 2, wherein said Discovery component includes configuration and initialization files and information representing different remote network devices on said network for specific device discovery.

7. An In-Context Launch Wrapper (ICLW) module as claimed in claim 2, wherein said Trap extension component includes Trap extension files for receiving the Simple Network Management Protocol (SNMP) traps and sending SNMP trap acknowledgments to remote network devices over said network.

8. An In-Context Launch Wrapper (ICLW) module as claimed in claim 2, wherein said Install component is extendable to accommodate installation of new device management applications and/or new enterprise management consoles at the host system with additional input files.

9. An In-Context Launch Wrapper (ICLW) module as claimed in claim 1, further providing one set of generic console integration code for automating integration of different device management applications into multiple Enterprise management consoles.

10. A computer usable medium having computer readable program code means embodied therein for use in a host system on a network to provide a comprehensive generic interface for automating integration of device management applications into existing enterprise management consoles installed at the host system for centralized remote device management of remote network devices on said network, said computer readable program code means comprising:

an Install module which provides a file based interface to device management applications for installation specific to existing enterprise management consoles at the host system;

a MConsole Interface module which provides a comprehensive generic interface to existing enterprise management consoles for enabling integration of said device management applications into the existing enterprise management consoles;

a Discovery module which provides a discovery interface to the existing enterprise management consoles for identifying remote network devices on said network; and a Trap Extension module which provides an extension interface to the existing enterprise management consoles for handling Simple Network Management Protocol (SNMP) traps on said network.

11. A computer usable medium as claimed in claim 10, wherein said computer readable code means provides an extensible set of generic console integration code for automating integration of different device management applications into multiple enterprise management consoles installed at the host system.

12. A computer usable medium as claimed in claim 10, wherein said Install module comprises:

an Install framework which supports a wizard application for guiding installation of the enterprise management consoles at the host system;

an Install Interface dynamic link library (DLL) which contains generic instruction sets for supporting installation of the enterprise management consoles at the host system and for providing console information including installation directory, language, and console version to the host system; and a plurality of console install libraries of different enterprise management consoles at the host system which serve as translators for respective enterprise management consoles for translating instructions from the Install Interface dynamic link library (DLL) requested from the Install framework into console specific commands for installation.

13. A computer usable medium as claimed in claim 10, wherein said MConsole Interface module comprises:

a MConsole Interface dynamic link library (DLL) which contains generic instruction sets for providing said comprehensive generic interface to said device management applications, and generic mechanisms to obtain generic and specific properties of the enterprise management consoles; and a plurality of console interface COM objects of different enterprise management consoles at the host system which serve as translators for respective enterprise management consoles for translating instructions from the device management applications into console specific commands for integration.

14. A computer usable medium as claimed in claim 10, wherein said Discovery module contains configuration and initialization files and information representing different remote network devices on said network for specific device discovery.

15. A computer usable medium as claimed in claim 10, wherein said Trap extension module contains Trap extension files for receiving the Simple Network Management Protocol (SNMP) traps and sending SNMP trap acknowledgments to remote network devices over said network.

16. A computer usable medium as claimed in claim 10, wherein said Install module is extendable to accommodate installation of new device management applications and/or new enterprise management consoles at the host system with additional input files.

17. A network system, comprising:

a plurality of remote network devices; and a host system connected to said plurality of remote network devices via communication links, said host system including at least one processor for processing one or more device management applications and one or more enterprise management console applications installed therein, and a computer usable medium having computer readable program code means embodied therein for providing a comprehensive generic interface to automate integration of device management applications into existing enterprise management consoles installed at said host system for centralized remote device management of remote network devices on said communication links, said computer readable program code means comprising:

an Install module which provides a file based interface to device management applications for installation specific to existing enterprise management consoles at said host system;

a MConsole Interface module which provides said comprehensive generic interface to existing enterprise management consoles for enabling integration of said device management applications into the existing enterprise management consoles;

a Discovery module which provides a discovery interface to the existing enterprise management consoles for identifying remote network devices on said communication links; and a Trap Extension module which provides an extension interface to the existing enterprise management consoles for handling Simple Network Management Protocol (SNMP) traps on said communication links.

18. A network system as claimed in claim 17, wherein said computer readable code means provides an extensible set of generic console integration code for automating integration of different device management applications into multiple enterprise management consoles installed at the host system.

19. A network system as claimed in claim 17, wherein said Install module comprises:

an Install framework which supports a wizard application for guiding installation of the enterprise management consoles at the host system;

an Install Interface dynamic link library (DLL) which contains generic instruction sets for supporting installation of the enterprise management consoles at the host system and for providing console information including installation directory, language, and console version to the host system; and a plurality of console install libraries of different enterprise management consoles at the host system which serve as translators for respective enterprise management consoles for translating instructions from the Install Interface dynamic link library (DLL) requested from the Install framework into console specific commands for installation.

20. A network system as claimed in claim 17, wherein said MConsole Interface module comprises:

a MConsole Interface dynamic link library (DLL) which contains generic instruction sets for providing said comprehensive generic interface to said device management applications, and generic mechanisms to obtain generic and specific properties of the enterprise management consoles; and a plurality of console interface COM objects of different enterprise management consoles at the host system which serve as translators for respective enterprise management consoles for translating instructions from the device management applications into console specific commands for integration.

21. A network system as claimed in claim 17, wherein said Discovery module contains configuration and initialization files and information representing different remote network devices on said network for specific device discovery.

22. A network system as claimed in claim 17, wherein said Trap extension module contains Trap extension files for receiving the Simple Network Management Protocol (SNMP) traps and sending SNMP trap acknowledgments to remote network devices over said network.

23. A network system as claimed in claim 17, wherein said Install module is extendable to accommodate installation of new device management applications and/or new enterprise management consoles at the host system with additional input files.

* * * * *